United States Patent [19]

Bonnard et al.

[11] Patent Number: 4,887,990
[45] Date of Patent: Dec. 19, 1989

[54] GEAR-SHIFT CONTROL BICYCLES AND SIMILAR VEHICLES

[75] Inventors: Rene Bonnard, Mereville; Pierre Bonnard, Realville; Christopher Desclozeaux, Mereville, all of France

[73] Assignee: R. Bonnard, P. Bonnard, C. Desclozeaux, and BG Innovations (SARL), France

[21] Appl. No.: 252,940

[22] Filed: Oct. 4, 1988

[30] Foreign Application Priority Data

Oct. 5, 1987 [FR] France ................... 87 13745

[51] Int. Cl.⁴ .............................. F16H 11/08
[52] U.S. Cl. ........................... 474/78; 474/80
[58] Field of Search ................... 474/77–82, 474/69, 70

[56] References Cited

U.S. PATENT DOCUMENTS 3,861,227  1/1975  Hunt ........................ 474/77 X
4,504,250  3/1985  Juy ........................... 474/80
4,507,101  3/1985  Nagano ..................... 474/78 X Primary Examiner—Thuy M. Bui
Attorney, Agent, or Firm—Browdy and Neimark

[57] ABSTRACT

A gear shift control for bicycles, of the "derailleur" type which has guiding members for a chain that can be moved crosswiss between at least two separate positions by a cable from a remotely located shifter, which includes a mobile element that receives the movement of the cable, a mobile toothed element connected to the guiding members of the chain, a memory element carried by the mobile element and working with the teeth of the mobile toothed element; and swinging members acting on the memory element so that, for a movement of the cable with a small amplitude, followed by a release, the toothed element is moved in a first direction along a path corresponding to the interval between two teeth, and for a movement of the cable of a greater amplitude, followed by a release, the toothed element is moved in a second direction also along a path corresponding to the interval between two teeth.

12 Claims, 5 Drawing Sheets

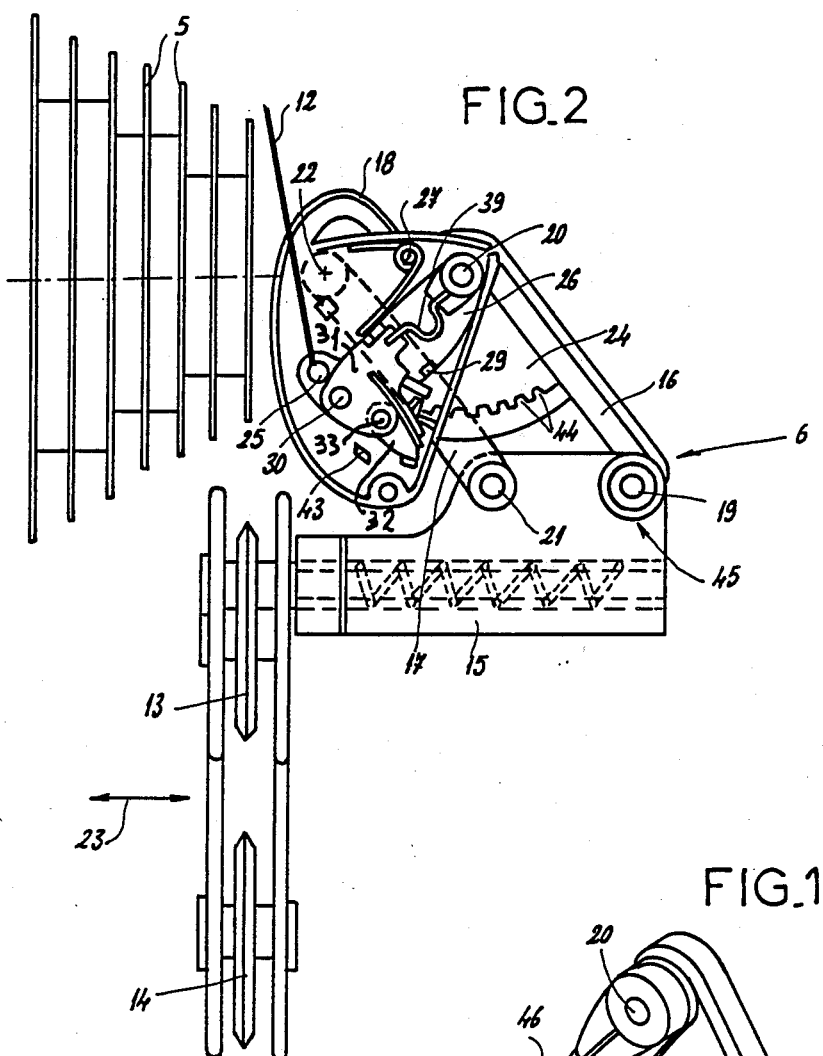
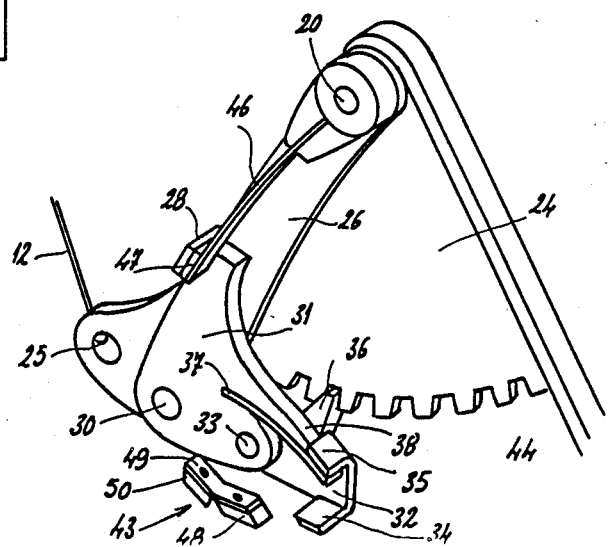

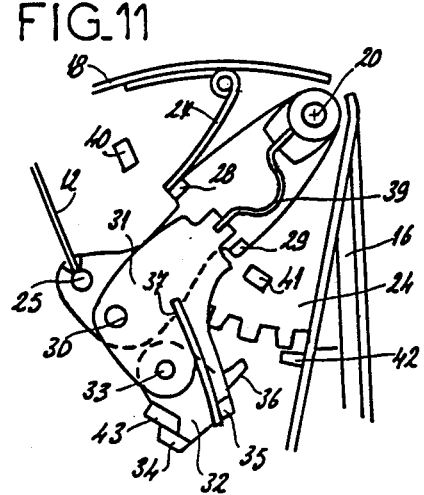
FIG.11
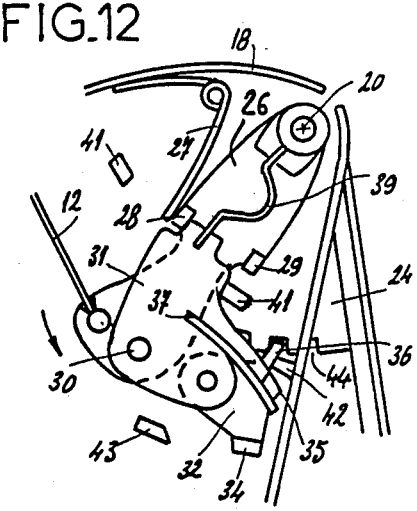
FIG.12
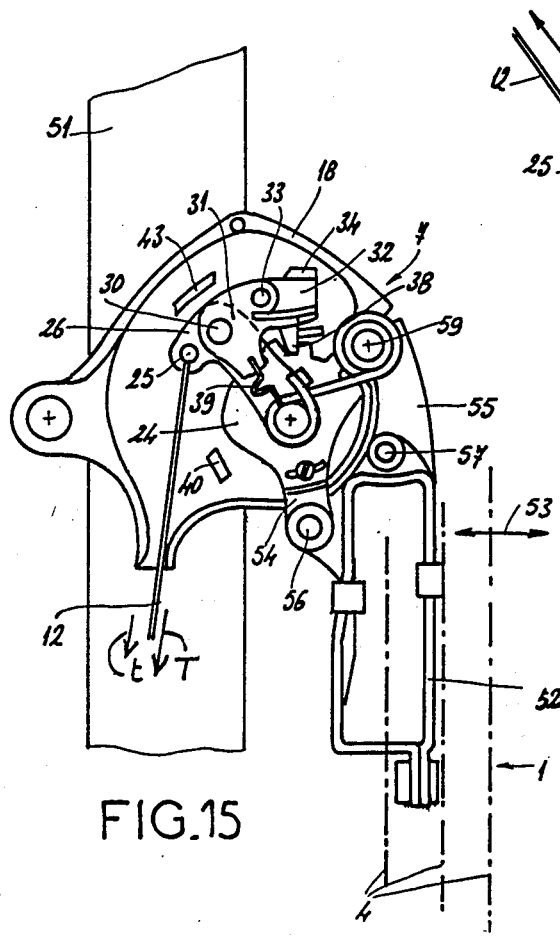
FIG.15
FIG.14

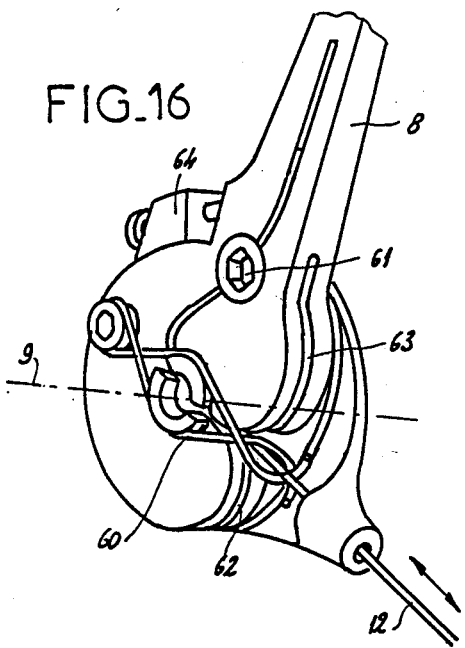
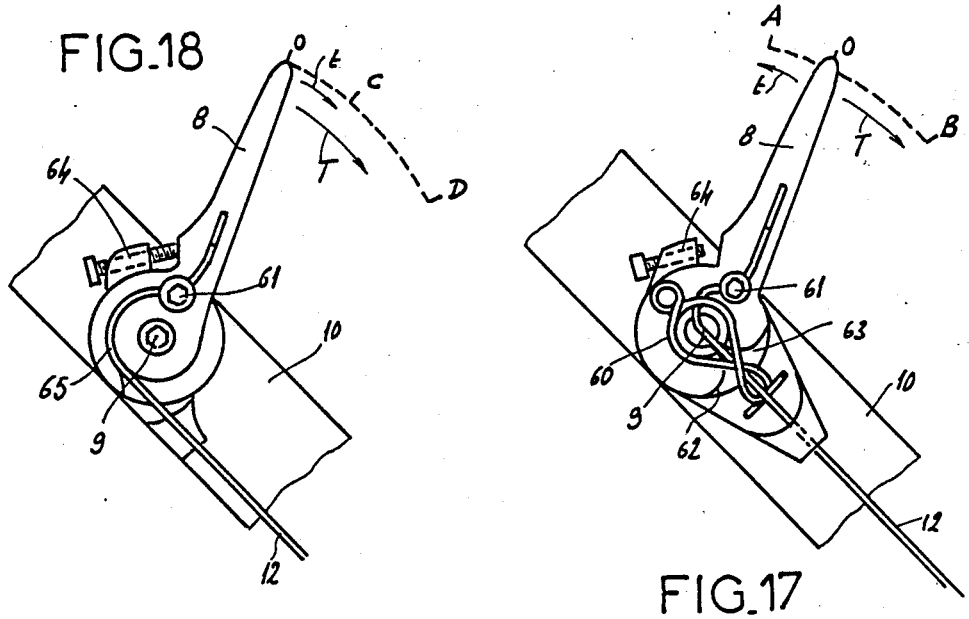

GEAR-SHIFT CONTROL BICYCLES AND SIMILAR VEHICLES

BACKGROUND OF THE INVENTION

The invention relates to a gear-shift control of bicycles and similar vehicles. This invention relates to the "rear" gear-shift control as well as to the "front" gear-shift control and it applies, more specifically, to gear shifts of the "derailleur" type, in which modification of the gear ratio is obtained by passage of the chain from one sprocket to another, in the case of a rear derailleur associated with a free wheel, or by passage of the chain from one toothed plate to another, in the case of a front derailleur associated with the crankset.

The rear or front derailleurs are controlled manually remotely, in the conventional way, by a cable ending at a pivoting shifter placed either on a tube of the bicycle frame or on an end of the bicycle handlebars. As a function of the angular position of the shifter, the chain passes on a certain sprocket, in the case of a rear derailleur, or on a certain plate, in the case of a front derailleur; thus, depending on the number of existing sprockets or plates, the shifter has several corresponding angular positions.

The result is that the handling of the shifter is difficult to understand and to learn, notably for beginners, the angular positions of the shifter being difficult to identify precisely in the usual absence of indexing means, and the direction and angles of rotation of the shifter that are necessary to obtain passage from one sprocket or from one plate to another being poorly understood. In the case of the rear derailleur, the correct angular positions of the shifter can be poorly perceived the more sprockets there are, these positions then being very close to each other. In the case of the front derailleur, an additional difficulty results from the fact that the direction of maneuvering the shifter is opposite to that of the rear derailleur: the cyclist must pull the shifter of the front derailleur toward himself, while pushing away the shifter of the rear derailleur to obtain, in the two cases, a higher gear.

Incorrect handling of the shifters that control the derailleurs is not without consequences. In particular, wrong positioning of the chain is the source of friction, disagreeable noises and, worse, jumps by the chain at the moment when the cyclist produces significant effort, which can cause a swerving of the cyclist, even a fall.

FIELD OF THE INVENTION

This invention aims to eliminate these drawbacks by providing a new gear-shift control of bicycles and similar vehicles that secures great ease of use, even for an inexperienced cyclist and that thus guarantees pleasure and safety.

For this purpose, the object of the invention is a gear-shift control of bicycles and similar vehicles, of the derailleur type, with means of guiding the chain that are movable crosswise between at least two separate positions by a traction element such as a cable from an actuating means such as a remote shifter, this control being characterized in that it comprises essentially, in combination:

a mobile element that receives the movement of the traction element such as the cable, a mobile toothed element, connected in its movements to the means of guiding the chain and comprising at least as many teeth as that of the separate positions occupied by said guiding means of the chain, a memory element carried by the receiving element and working with the teeth of the toothed element, and swinging means acting on the memory element during its movements accompanying those of the receiving element so that, for a movement of the traction element such as a cable of narrow amplitude, followed by a release, the toothed element is moved in a first direction along a path corresponding to the interval between two teeth and, for a movement of the traction element such as a cable of a wider amplitude, still followed by a release, the toothed element is moved in a second direction also along a path corresponding to the interval between two teeth.

The control produced according to the principle of the invention has many advantages in comparison with standard controls:

In the first place, the selection of a speed and the passage to another speed does not resort to a positioning or an adjustment that has to be "measured out" precisely and without reference marks by the cyclist; the latter has only to apply a simple impulsive force on the shifter, in a certain direction, and by going to the end of the stroke, from a rest and return movement position of the shifter, which is invariable. The correct placement of the crosswise guiding means of the chain is automatically assured by the mechanism itself.

Since the manipulations of the shifter drive, by traction of the cable directed always in the same direction, an intermediate mobile element, for each of the operations benefit is taken of the entire tractive forces exerted on the shifter to cause a small movement of the crosswise guiding means of the chain. Further, the shifter not being subjected to any friction system, in all cases a very easy manipulation of the latter is obtained, which secures great comfort in use.

Since the release of the shifter automatically causes a return of the latter in the same return movement position, the use becomes simplified and made faster. A simple impulsive force on the shifter to the end of the stroke, in one direction or the other, makes possible an assured and precise gear shift.

The control that is the object of the invention can be used with rear and front derailleurs while retaining a standard basic structure, notably the rear derailleurs with deformable parallelogram and small guiding wheels of the chain, and the front derailleurs with a yoke through with the chain passes.

Finally, the control principle according to the invention makes it possible to mount the shifter at any place on the bicycle or similar vehicle equipped with this control.

The receiving element can consist of an arm mounted to pivot around a pin, subjected to the action of a return spring and actuated in one direction by the traction element such as a cable, whose end is attached to this pivoting arm.

The toothed element advantageously consists of a sector mounted to turn by its top around a pin and provided with a series of teeth on its curved edge.

In the case of a control applied to a derailleur with a deformable parallelogram, the said arm and the toothed sector are preferably mounted to pivot around the same pin merged with an hinge pin of a connecting rod of the parallelogram, the toothed sector being connected in rotation with the connecting rod, preferably in an adjustable manner. The embodiment is thus relatively simple.

According to a particular embodiment, the memory element comprises a primary part articulated directly on the pivoting arm and brought back to at least one preferred position, and one secondary part articulated on the primary part and provided with a pin turned toward the toothed element and provided to engage in the teeth of that element.

The primary part can be designed as a swinging part, mobile between two stable positions defined by stops carried by the pivoting arm and subjected to the action of a spring for passing the dead center point, the swinging means causing the passage of said primary part from one stable position to another.

In a variant, the primary part is thrust by a spring toward a single stable position defined by a stop carried by the pivoting arm, the swinging means causing the separation of the primary part and the stop.

These swinging means comprise a plurality of essentially stationary stops, working with the mobile parts of the mechanism.

According to one embodiment, the secondary part comprises two projections, the first projection working with a stop belonging to the swinging means by alternately passing from one side to the other of this stop, and the second projection being subjected to the action of a spring pushing this projection against a nose of the primary part.

In the case where the primary part has a single stable position, the stop with which the first projection of the secondary part works is a semimobile stop comprising a stationary part and a mobile part joined at the stationary part by a spring leaf.

According to another aspect of the invention, in case the traction element is a cable, the actuating means is a shifter that can be moved by pivoting from a rest position to one or the other of two other positions, to exert on the cable either a traction of small amplitude or a traction of greater amplitude, spring means being provided to bring the shifter back into its rest position from one or the other of the two other positions. These two other positions of the shifter are particularly located on each side of the rest position, and the shifter then comprises two cams for winding the cable, the cable winding itself around one or the other cam and over lengths that differ according to the actuation direction of the shifter.

In any case, the invention will be better understood with the aid of the following description, with reference to the accompanying diagrammatic drawing representing, by way of nonlimiting example, some embodiments of this gear-shift control of bicycles and similar vehicles.

BRIEF DESCRIPTION OF THE DRAWING

FIG. 2 is a rear view of a rear derailleur with a parallelogram provided with a control according to the invention, in a first embodiment;

FIGS. 3 to 12 are partial views, on an enlarged scale, of the control of FIG. 2, in the various positions occupied during operation;

FIG. 13 is a partial perspective view of a variant of this control for rear derailleur;

FIG. 14 illustrates a particular phase of operation of the variant according to FIG. 13;

FIG. 15 is a rear view of a front derailleur provided with a control according to the invention;

FIG. 16 is a partial perspective view of a shifter for actuating gear shifts provided with a control according to the invention;

FIG. 17 is a side view of the shifter of FIG. 16, with indication of its positions;

FIG. 18 is a view similar to FIG. 17, but relates to a variant of this shifter.

DESCRIPTION OF THE PREFERRED EMBODIMENT

Figure 1:
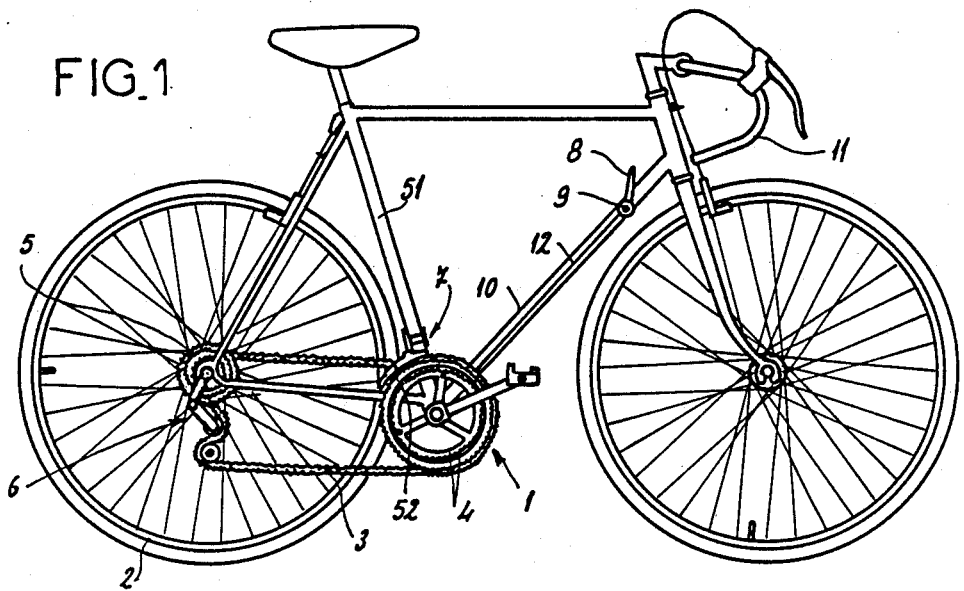
FIG. 1 is an overall side view of a bicycle equipped with front and rear gear shifters able to be actuated by controls according to this invention.

FIG. 1 shows a bicycle in which the transmission between crankset 1 and rear wheel 2 is provided by an endless chain 3 passing, in front, on one or the other of two or more toothed plates 4 and, in the rear, on one of several sprockets 5 belonging to a "free wheel" mechanism. Plate 4 and sprocket 5, on which chain 3 passes at a given moment, determine the gear ratio. A rear derailleur 6 makes it possible to make chain 3 pass from one sprocket 5 to another sprocket. A front derailleur 7, associated with crankset 1, is provided to make the same chain 3 pass from one of toothed plates 4 to the other. Each rear or front derailleur, respectively 6 or 7, can be controlled manually remotely with the aid of a shifter 8 mounted to pivot around a pin 9 and located, for example, on diagonal tube 10 of the bicycle frame, or even on handlebar 11. A cable 12, represented only partially, connects each shifter 8 to corresponding derailleur 6 or 7.

In the case of a standard gear shift, the selection of a ratio and the passage from one speed to another is performed by bringing shifter 8 into various angular positions around its swivel pin 9. To each angular position of shifter 8 there corresponds a particular position of cable 12 that causes the selection of a plate 4 or a sprocket 5, thus determining a speed.

On the other hand, in the case of this invention, shifter 8 and cable 12 occupy an invariable rest position, and the shifting of gears is obtained by an action on shifter 8 followed by a release of this latter and accompanied by a traction on cable 12. More particularly, shifter 8 makes it possible to exert on cable 12 two differentiated actions, namely a traction of small amplitude or a traction or greater amplitude, by means that will be described in detail below. One of the actions causes passage to a higher speed and the other action causes the opposite passage to a lower speed, whether rear derailleur 6 or front derailleur 7 is involved.

The conversion of the controlled movement of cable 12 is provided, at the level of the derailleur, by a mechanism represented in FIG. 2, in the case of application to a rear derailleur 6 of the parallelogram type. Rear derailleur 6 comprises, in a well-known way, two small wheels 13 and 14 for guiding and tension of the chain (not represented here), which are carried by a mobile support 15 connected in an articulated manner, by two parallel connecting rods 16 and 17, to a stationary support 18 mounted on the bicycle frame. Two supports 15 and 18, two connecting rods 16 and 17 and their four hinge pins 19, 20, 21 and 22 define a deformable parallelogram, thanks to which the vertical plane containing two small wheels 13 and 14 can be moved crosswise along arrow 23, to be brought to converge with the plane of one or the other of sprockets 5. Stationary support 18 itself forms a housing or is solid with a housing that encloses the mechanism involved.

This mechanism comprises a toothed sector 24, mounted to turn by its top around a hinge pin 20 and made solid in rotation in an adjustable way with connecting rod 16 so that the pivoting of sector 24 is accompanied by that of connecting rod 16.

The end of cable 12 that is away from the shifter consists of a welded cylindrical tip 25 embedded in a recess of an arm 26 also mounted to pivot around said pin 20. Pivoting arm 26, thus constituting the receiving element of the movement transmitted by cable 12, is returned to a rest position by a spring 27, free to act when the shifter is released; spring 27 rests, on the one hand, against the wall of housing 18 and, on the other hand, against a first stop 28 made solid with pivoting arm 26. A second stop 29 is provided on this arm 26 opposite first stop 28.

Arm 26 comprises, toward its end away from its swivel pin 20, a hinge pin 30 for a complex memory element that comprises a primary part 31 articulated directly on arm 26 around pin 30 and a secondary part 32 articulated on primary part 31 around a pin 33, the different pins 20, 30 and 33 being parallel to each other. Secondary part 32 comprises, toward its free end, two projections 34 and 35 and it is provided again with a pin 36 turned toward toothed sector 24 and intended to engage in the teeth of this sector 24. A spring leaf 37, fastened in primary part 31 and resting under projection 35 of secondary part 32, pushes this projection 35 against a nose 38 of primary part 31.

Another spring 39 acts on primary part 31 like a spring for passing the dead center point to push this primary part 31 toward one or the other of the two extreme swinging positions, defined respectively by the opposite stops 28 and 29 carried by pivoting arm 26 and working with the corresponding parts of primary part 31.

The mechanism further comprises swinging means consisting of several stops 40, 41, 42 and 43 stationary with respect to housing 18. Two first stationary stops 40 and 41 are provided, respectively on each side of pivoting arm 26. Third stationary stop 42 is located on the path of pin 36 of secondary part 32. Last stationary stop 43 is placed on the path of projection 34 of this secondary part 32.

Figure 3:
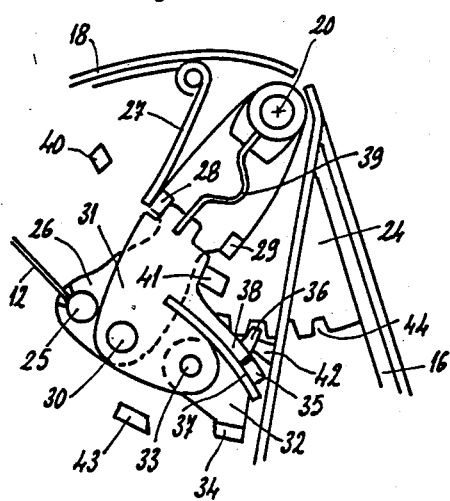

In rest position, as shown in FIG. 3, primary part 31 rests in a swinging position against stop 28 of arm 26, and is thus stopped against stationary stop 41. Pin 36 of secondary part 32 rests on stationary stop 42 and is engaged in one of teeth 44 of toothed sector 24. The angular position of sector 24 is thus "locked," thus the orientation of connecting rod 16 is stationary, which determines the selection of a particular sprocket 5 corresponding to a given speed.

Figure 4:
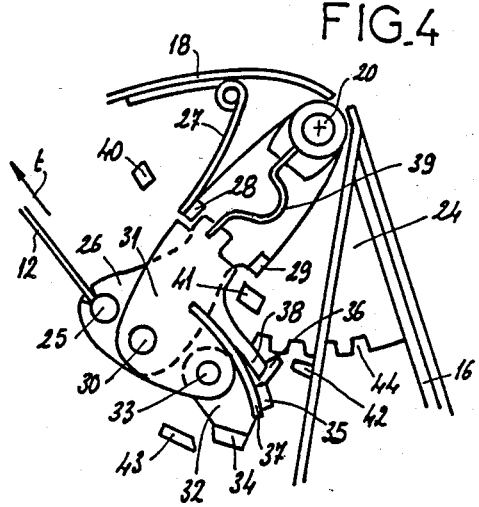
Figure 5:
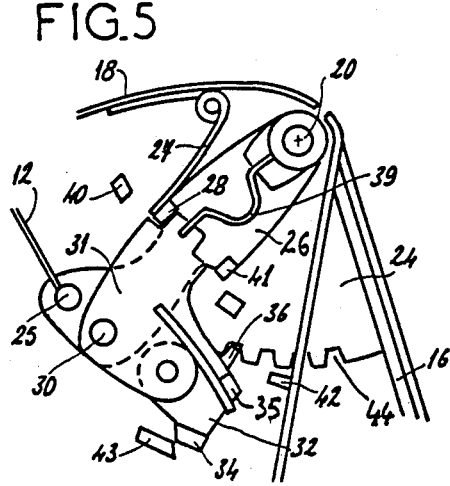

Starting from this rest position, it is supposed that cable 12 is actuated by undergoing and transmitting a traction of small amplitude t. As shown in FIG. 4, arm 26 is then moved in the direction of its pivoting around pin 20 against the action of return spring 27. Secondary part 32 then pivots around pin 33, its pin 36 escaping tooth 44 of sector 24 in which it was engaged, projection 33 moving away from nose 38 by making leaf spring 37 bend. Traction t on cable 12 continuing, pin 36 falls back into next tooth 44 of sector 24—see FIG. 5.

Figure 6:
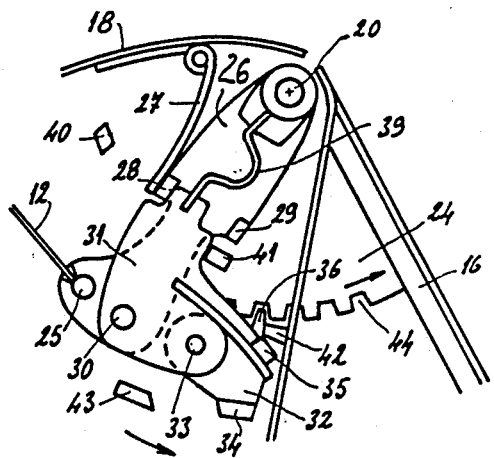
Figure 7:
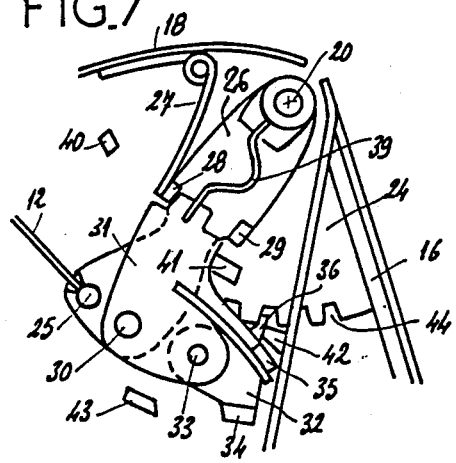
Figure 8:
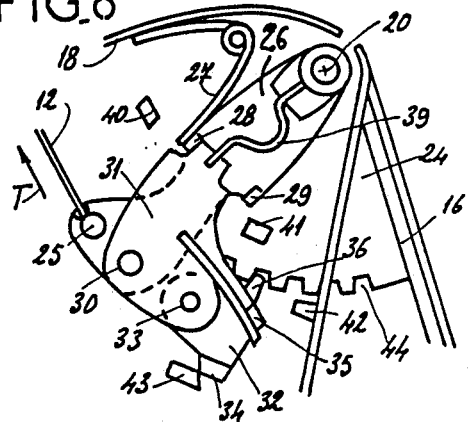

If traction t exerted on cable 12 is released at this precise moment, return spring 27 brings pivoting arm 26 back to its rest position and pin 36, accompanying arm 26 in its pivoting, makes toothed sector 24 also turn around pin 20, at an angle of rotation corresponding to the interval that separates two consecutive teeth 44 of this sector 24. The mechanism thus makes connecting rod 16 of the parallelogram pivot counterclockwise and it consequently causes passage of the chain to a sprocket 5 located more to the right (by reference to FIG. 2). FIG. 6 shows the mechanism brought back to its rest position at the end of this gear shifting process.

By referring to FIGS. 7 to 12, the case is now considered in which cable 12 undergoes and transmits a traction of greater amplitude T, which is not released after a length of movement corresponding to the interval between two teeth 44 of sector 24 but corresponds to at least double that interval. Starting from the rest position indicated in FIG. 7 (initial position identical to that of FIG. 3), arm 26 is made to pivot around pin 20, always in the direction going against the action of return spring 27. As in the preceding case, pin 36 of secondary part 32 escapes tooth 44 in which it was engaged and falls back into the next tooth—see FIG. 8. At this moment, pin 34 of secondary part 32 comes to bear against a side of stationary stop 43.

The pivoting movement of arm 26 continuing under the effect of prolonged traction T on cable 12, secondary part 32 is kept meshed with toothed sector 24 by pin 36, and this toothed sector 24 is consequently driven clockwise in rotation around pin 20, at an angle corresponding to at least the interval between two teeth 44. Driving connecting rod 16 of the parallelogram with it in the same direction, toothed sector 24 thus causes passage of the chain toward a sprocket 5 located more to the left (still with reference to FIG. 2).

Figure 9:
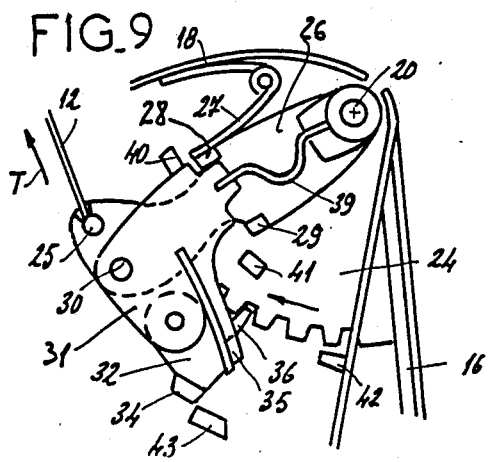
Figure 10:
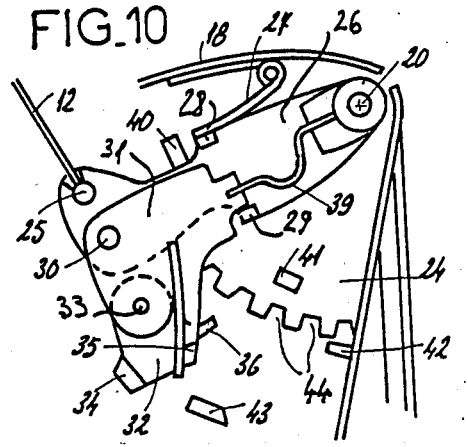

At this stage, as shown in FIG. 9, the shoulder located on the left edge of primary part 31 comes into contact with stationary stop 40; the latter causes a swinging of primary part 31 which then comes to stop against other stop 28 carried by arm 26, as shown in FIG. 10. The swinging of primary part 31 moves secondary part 32 and releases pin 36 from the teeth of sector 24.

During the release of traction T on cable 12, pivoting arm 26 is returned to its initial position by spring 27. Because of the preceding swinging of primary part 31, projection 34 of secondary part 32 passes, during the return movement that begins, from the side of stationary stop 43 other than the one during the forward movement—see FIG. 11. Before the return to the rest position of the entire mechanism, the shoulder located on the right edge of primary part 31 encounters stationary stop 41, which causes another swinging of primary part 31, bringing it against first stop 28, supported by arm 26. Pin 36 again comes to be engaged in a tooth 44 of sector 24, stationary stop 42 assuring immobilization in rotation of this sector 24 by resting on pin 36, as shown in FIG. 12.

It is to be noted that the operation described above is made possible and certain by the addition to the deformable parallelogram, for example at the level of pin 19, of a friction device 45 that brakes the movements themselves of the unit formed by this parallelogram and by toothed sector 24. In contrast, the parallelogram here includes no return spring.

FIGS. 13 and 14 relate to a variant of the mechanism described above with reference to FIGS. 2 to 12 and belonging to a rear derailleur. The elements common to the two embodiments are designated in the drawing by the same references and do not constitute the object of a new detailed description. In the variant are found the principal elements which are toothed sector 24, pivoting arm 26, primary part 31 mounted to pivot around a pin 30 on arm 26 and secondary part 32 with pin 36, mounted to pivot on primary part 31 around pin 33.

Pivoting arm 26 comprises, in this variant, a single stop 28, the second stop being eliminated here. A leaf spring 46, resting on a hump 47 of primary part 31, pushes this primary part 31 to rest against stop 28.

The stationary stop designated by 42 in the preceding embodiment is also eliminated and stop 43 is modified to constitute here a "semimobile" stop. This stop 43 comprises a first part 48 that is stationary with respect to housing 18, to which there is fastened, by gluing or riveting, a bent leaf spring 49. Another part 50 is fastened, by the same means, to leaf spring 49; this other part 50 constitutes the mobile part of stop 43, considering the flexibility of leaf spring 49.

The operation remains identical to that of the first embodiment, in the case of traction exerted on cable 12 with a small amplitude. If traction T on cable 12 is performed at a greater amplitude, projection 34 of secondary part 32 passes from one side of semimobile stop 43 and, when projection 34 has passed semimobile stop 43, arm 26 comes to stop against stationary stop 40 and it can then be released—see the position indicated in FIG. 14.

During the return movement of pivoting arm 26 under the effect of return spring 27, projection 34 of secondary part 32 passes from the other side of semimobile stop 43, forcing pin 36 to move away from teeth 44 of sector 24, primary part 31 and secondary part 32 describing a pivoting. After passing semimobile stop 43, projection 34 is released and, under the effect of spring 37, pin 36 comes back to engage in a tooth 44 of sector 24, stationary stop 42 again acting to "lock" the ratio just obtained.

FIG. 15 illustrates the application to a front derailleur 7 fastened to seat tube 51 of the control produced according to the first embodiment described above. In a well-known way, front derailleur 7 comprises a yoke 52 through which the chain passes and whose lateral movement according to arrow 53 causes the passage of the chain from one of toothed plates 4 to the other, crankset 1 comprising three plates 4 in the example considered. Yoke 52 is mounted movably by a deformable parallelogram system with two connecting rods 54 and 55: yoke 52 is articulated, around respective pins 56 and 57, at the lower ends of both connecting rods 54 and 55, whose upper ends are articulated, along with respective pins 58 and 59, on a housing 18 fastened to seat tube 51.

Housing 18 encloses a mechanism made according to the principle described above, thus comprising mainly a toothed sector 24, a pivoting arm 26, a primary part 31 and a secondary part 32, as well as various stops. The mechanism functions in the same way as the one described above in the case of a front derailleur, under the effect of a traction with differentiated amplitude t or T exerted on cable 12 and thanks to a friction exerted on one of the pins of the parallelogram, to control the angular position of toothed sector 24. The latter is connected in rotation in an adjustable way to connecting rod 54 to control the positioning and movement of yoke 52.

Finally, FIGS. 16 to 18 represents a shifter 8 intended for front or rear gear shifts provided with a control according to this invention. Shifter 8 is mounted freely in rotation around its swivel pin 9 and it normally occupies a rest position from which it is moved only to actuate the front or rear derailleur by cable 12.

In the case of FIGS. 16 and 17, shifter 9 is provided to exert on cable 12 a traction t of small amplitude when it is pushed forward up to indicated position A and to exert on cable 17 a traction T of greater amplitude when it is pulled in the opposite direction, thus toward the rear, up to indicated position B.

A spring 60 encloses cable 12, whose end is locked at 61 on shifter 8 and it assures the return movement and the holding of this shifter 8 in its rest position 0. The periphery of shifter 8 forms a first cam 62 on which cable 12 is wound when this shifter 8 is pushed forward and a second cam 63 on which cable 12 is wound when this shifter 8 is pulled toward the rear. An adjustable stop 64 limits the pivoting of shifter 8 around pin 9 when the shifter is pushed forward. Shifter 8 return by itself to the rest position under the effect of spring 60 as soon as it is released.

In a variant, shown in FIG. 18, the two separate actions are exerted on shifter 8 in the same direction, namely in the two cases a traction toward the rear: shifter 8 is pulled either up to position C, quite near rest position O or up to position D, further away from this rest position. Shifter 8 comprises here a single cam 65 on which cable 12 is wound more or less tightly according to position C or D attained by this shifter 8.

Of course, the invention is not limited only to the embodiments of this gear-shift control of bicycles and similar vehicles that were described above by way of example; it encompasses, on the contrary, all the variants of embodiment and application that follow the same principle. In particular, it would not be going out of the context of the invention to have:

modifications in form and/or placement of the elements of the mechanism or a different arrangement of the stops acting in the operation of this mechanism;

a modification of the connection made between the toothed sector of the mechanism and one of the mobile elements of the deformable parallelogram;

a destination different from the one described, the mechanism according to the variant of FIGS. 13 and 14 thus being able to be applied also to a front derailleur;

replacement of the shifter by any equivalent means of actuation, placed at the same spot or at another point and being able to be a lever, a rocker or a button actuated manually, even a micromotor;

the addition of any supplementary devices such as means of adjusting the tension of the cable or additional means making it possible, in the case of a front derailleur, for the yoke to recenter itself automatically with respect to the chain.

We claim:

1. Gear-shift control of bicycles and the like, of the "derailleur" type with guiding means (13, 14; 52) for chain (3) that can be moved crosswise (arrows 23, 53) between at least two separate positions by a traction element such as a cable (12) from an actuating means such as a shifter (8) located remotely; characterized in that it comprises essentially, in combination:

a mobile element (26) that receives the movement of the traction element such as cable (12), a mobile toothed element (24), connected in its movements to guiding means (13, 14; 52) of chain (3) and comprising teeth (44) whose number at least equals that of the separate positions occupied by said guiding means of the chain, a memory element (31, 32) carried by receiving element (26) and working with the teeth of toothed element (24) and swinging means (40, 41, 42, 43) acting on memory element (31, 32) during its movements that accompany those of receiving element (36) so that, for a movement of the traction element such as cable (12) with a small amplitude, followed by a release, toothed element (24) is moved in a first direction along a path corresponding to the interval between two teeth (44) and, for a movement of traction element such as cable (12) of a greater amplitude, still followed by a release, toothed element (24) is moved in a second direction also along a path corresponding to the interval between two teeth (44).

2. Gear-shift control of bicycles and the like according to claim 1 wherein toothed element (24) is a sector, mounted to turn by its top around a pin (20) and provided with a series of teeth (44) on its curved edge.

3. Gear-shift control of bicycles and the like, according to claim 1, wherein receiving element (26) consists of an arm mounted to pivot around a pin (2), subjected to the action of a return spring (27) and actuated in one direction by the traction element such as cable (12) whose one end is attached (at 25) to this pivoting arm (36).

4. Gear-shift control of bicycles and the like according to claim 2 applied to a derailleur with a deformable parallelogram, wherein said arm (26) and toothed sector (24) are mounted to pivot around the same pin (20;58) merged with a hinge pin of a connecting rod (16; 54) of the parallelogram, toothed sector (24) being connected in rotation with connecting rod (16; 54), preferably in an adjustable way.

5. Gear-shift control of bicycles and the like according to claim 2 wherein the memory element comprises a primary part (31) articulated directly (at 30) on pivoting arm (26) and returned to at least one preferred position and a secondary part (32) articulated (at 33) on primary part (31) and provided with a pin (36) turned toward toothed element (24) and intended to engage in teeth (44) of this element (24).

6. Gear-shift control of bicycles and the like according to claim 5, wherein primary part (31) is designed as a swinging part, mobile between two stable position defined by stops (28, 29) carried by pivoting arm (26) and subjected to the action of a spring (39) that passes dead center, swinging means (40, 41, 42, 43) causing the passage of said primary part (31) from one stable position to another.

7. Gear-shift control of bicycles and the like according to claim 6 wherein the swinging means comprise a plurality of essentially stationary stops (40, 41, 42, 43).

8. Gear-shift control of bicycles and the like according to claim 7, wherein secondary part (32) comprises two projections (34, 35), first projection (34) working with a stop (43) associated with the swinging means by alternately passing from one side of this stop (43) to the other and second projection (35) being subjected to the action of a spring (37) that pushes this projection (35) against a nose (38) of primary part (31).

9. Gear-shift control of bicycles and the like according to claim 5, wherein primary part (31) is pushed by a spring (46) to a single stable position defined by a stop (28) carried by pivoting arm (26), swinging means (40, 42, 43) causing the separation of primary part (31) and stop (28).

10. Gear-shift control of bicycles and the like according to claim 9 wherein stop (43), with which first projection (34) of secondary part (32) works, is a semimobile stop having a stationary part (48) and a mobile part (50) joined to stationary part (48) by a leaf spring (49).

11. Gear-shift control of bicycles and the like according to claim 1 in which the traction element is a cable (12), wherein the actuation means is a shifter (8) that can be moved by pivoting from one rest position (0) to one or the other of two other positions (A, B; C, D) to exert on cable (12) either a traction with small amplitude (t) or a traction of greater amplitude (T), spring means (60) being provided to bring shifter (8) into its rest position (0) from one or the other of the two other positions (A, B; C, D).

12. Gear-shift control of bicycles and the like according to claim 11, wherein the two other positions (A, B) of shifter (8) are located one each side of rest position (0) and wherein shifter (8) comprises two cams (62, 63) for winding cable (12), cable (12) being wound around one or the other cam (62, 63) and over different lengths depending on the direction of actuation of shifter (8).

* * * * *